US010238045B2

(12) United States Patent
Boys et al.

(10) Patent No.: US 10,238,045 B2
(45) Date of Patent: Mar. 26, 2019

(54) TIMBER-WORKING DEVICE AND TIMING LINK FOR SAME

(71) Applicant: Waratah NZ Limited, Tokoroa (NZ)

(72) Inventors: Michael Boys, Tokoroa (NZ); Justyn Peter Smythe, Tokoroa (NZ)

(73) Assignee: Waratah NZ Limited, Tokoroa (NZ)

( * ) Notice: Subject to any disclaimer, the term of this patent is extended or adjusted under 35 U.S.C. 154(b) by 153 days.

(21) Appl. No.: 15/100,179

(22) PCT Filed: Nov. 29, 2013

(86) PCT No.: PCT/NZ2013/000218
§ 371 (c)(1),
(2) Date: May 27, 2016

(87) PCT Pub. No.: WO2015/080597
PCT Pub. Date: Jun. 4, 2015

(65) Prior Publication Data
US 2017/0020085 A1    Jan. 26, 2017

(51) Int. Cl.
*A01G 23/08*    (2006.01)
*A01G 23/083*    (2006.01)
*A01G 23/095*    (2006.01)

(52) U.S. Cl.
CPC ......... *A01G 23/083* (2013.01); *A01G 23/095* (2013.01)

(58) Field of Classification Search
CPC .... A01G 23/08; A01G 23/081; A01G 23/083; A01G 23/087; A01G 23/091; A01G 23/093; A01G 23/095
See application file for complete search history.

(56) References Cited

U.S. PATENT DOCUMENTS

| | | | |
|---|---|---|---|
| 6,189,585 B1* | 2/2001 | Johansson | A01G 23/081 144/246.1 |
| 8,002,004 B2* | 8/2011 | Smythe | A01G 23/095 144/24.13 |
| 8,528,953 B2 | 9/2013 | Maffeis | |
| 8,590,769 B2 | 11/2013 | LaValley et al. | |
| 8,992,159 B2* | 3/2015 | Sintek | B66C 1/427 414/741 |
| 2010/0314000 A1 | 12/2010 | Smythe et al. | |
| 2013/0177373 A1 | 7/2013 | Sintek et al. | |
| 2014/0238544 A1* | 8/2014 | Kaye | A01G 23/083 144/335 |
| 2015/0144225 A1* | 5/2015 | Stulen | B27L 1/005 144/208.91 |

OTHER PUBLICATIONS

Patent Cooperation Treaty, International Search Report in Application No. PCT/NZ2013/000218, dated Apr. 25, 2014.
Kesla, Kesla 25RH, 25RHS, Spare Parts Lists, 2008.

* cited by examiner

*Primary Examiner* — Matthew G Katcoff
(74) *Attorney, Agent, or Firm* — Klintworth & Rozenblat IP LLP

(57) ABSTRACT

A timber-working device having a first pivoting drive arm and a second pivoting drive arm, and a timing link for connecting them. The timing link includes an elongate member having a first end and a second end. A first aperture is at the first end and a second aperture at the second end. At least one of the first aperture and the second aperture is elongate along the length of the member.

9 Claims, 5 Drawing Sheets

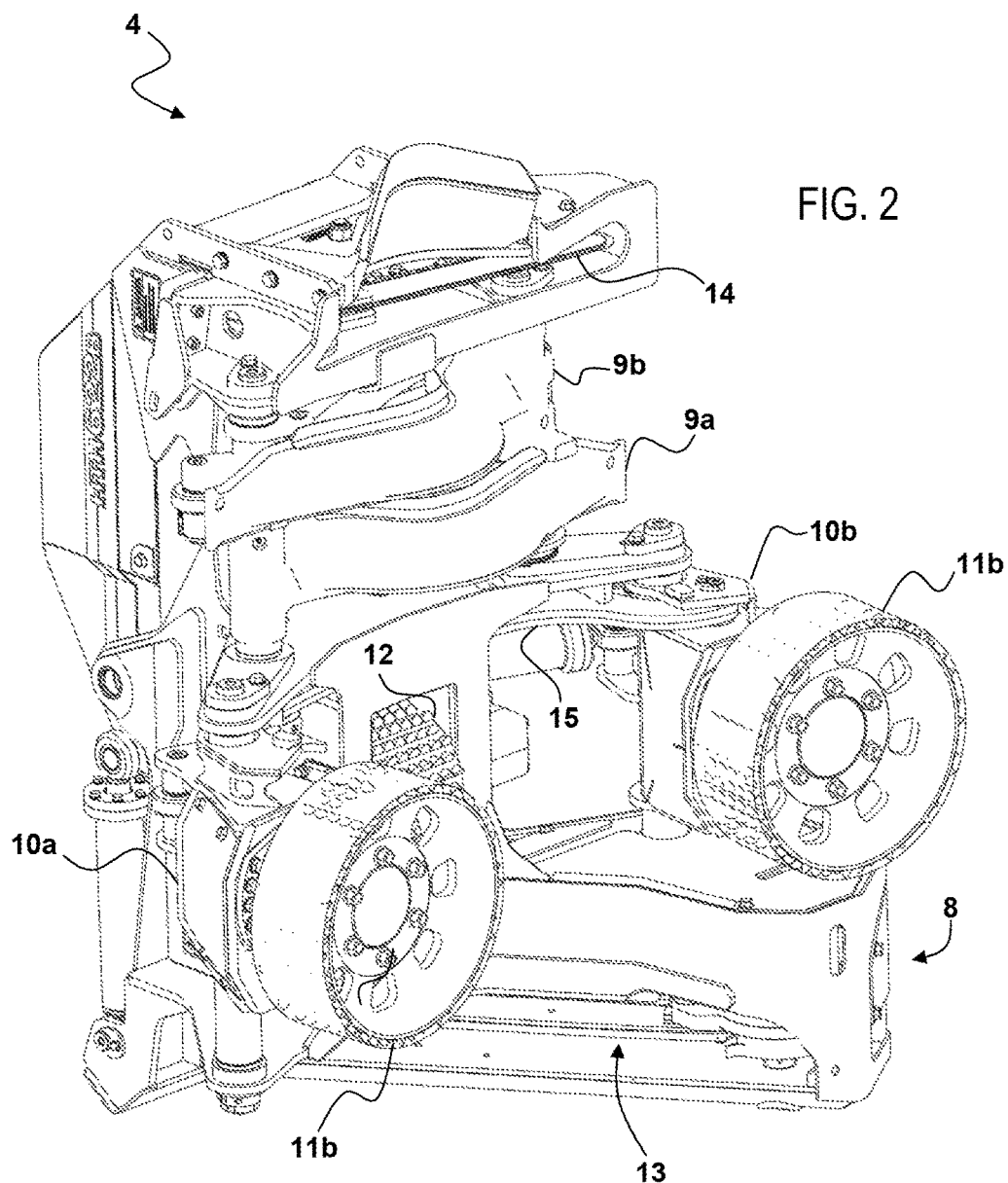

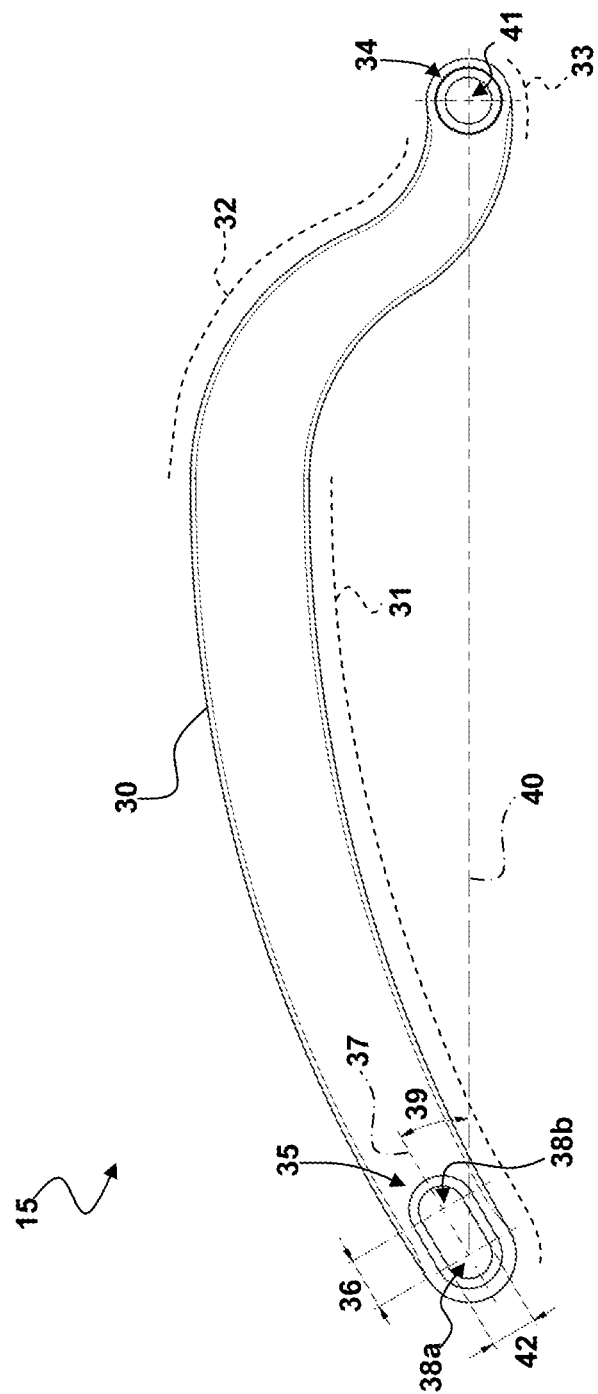

TIMBER-WORKING DEVICE AND TIMING LINK FOR SAME

CROSS-REFERENCE TO RELATED APPLICATION(S)

This application is a U.S. National-Stage entry under 35 U.S.C. § 371 based on International Application No. PCT/NZ2013/000218, filed Nov. 29, 2013.

STATEMENT OF FEDERALLY SPONSORED RESEARCH OR DEVELOPMENT

Not Applicable.

FIELD OF THE DISCLOSURE

The present disclosure relates to a timber-working device and a timing link for same.

BACKGROUND OF THE DISCLOSURE

It is well-known to mount timber-working devices, commonly referred to as forestry or harvester heads, to a carrier vehicle in order to perform a number of operations in connection with timber processing. These operations may include one, or a combination of, grappling and felling a standing tree, delimbing a felled stem, debarking the stem, and cutting the stem into logs (known as bucking) commonly using at least one chainsaw.

Feeding the stem along its length relative to the head is typically achieved using arm mounted rotary drives having a feed wheel at the end of opposing drive arms configured to grasp the stem, together with at least one frame mounted feed wheel.

It is generally desirable to have the drive arms close at the same rate in order to center them (and the stem or stems they are acting against) in the head. It is known to provide a timing link between the drive arms in order to achieve this.

However, where there is variance in the size or linearity of the stem this synchronization can lead to one of the wheels having a lesser degree of contact with the stem than the other, creating inefficiencies.

SUMMARY OF THE DISCLOSURE

According to one aspect of the present disclosure there is provided a timing link for connecting a first pivoting drive arm and a second pivoting drive arm of a timber-working device, including: an elongate member having a first end and a second end, and a first aperture at the first end and a second aperture at the second end, wherein at least one of the first aperture and the second aperture is elongate along the length of the member.

According to another aspect of the disclosure there is provided a timber-working device, including: a frame; a first drive arm and a second drive arm, the first arm and second arm pivotally attached to the frame; and a timing link including an elongate member having a first end and a second end, and a first aperture at the first end and a second aperture at the second end, wherein at least one of the first aperture and the second aperture is elongate along the length of the member, wherein the timing link is connected to the first and second arms via the first and second apertures.

According to another aspect of the disclosure, a timber-working device has a frame, a first drive arm and a second drive arm pivotally attached to the frame, a first hydraulic cylinder connected between the first drive arm and the frame, and a second hydraulic cylinder connected between the second drive arm and the frame. The first hydraulic cylinder and the second hydraulic cylinder are operable to pivot the first drive arm and the second drive arm relative to the frame. A timing link has an elongate member with a first end and a second end, and a first aperture at the first end and a second aperture at the second end. At least one of the first aperture and the second aperture is elongate along the length of the member. The timing link is connected to the first drive arm and the second drive arm via the first and second apertures.

Further aspects and advantages of the present disclosure will become apparent from the ensuing description which is given by way of example only.

BRIEF DESCRIPTION OF THE DRAWINGS

Further aspects of the present disclosure will become apparent from the following description which is given by way of example only and with reference to the accompanying drawings in which:

FIG. 2 is a perspective view of the forestry head;

FIG. 3 is face on view of an example timing link for use in the forestry head;

DETAILED DESCRIPTION

Figure 1:
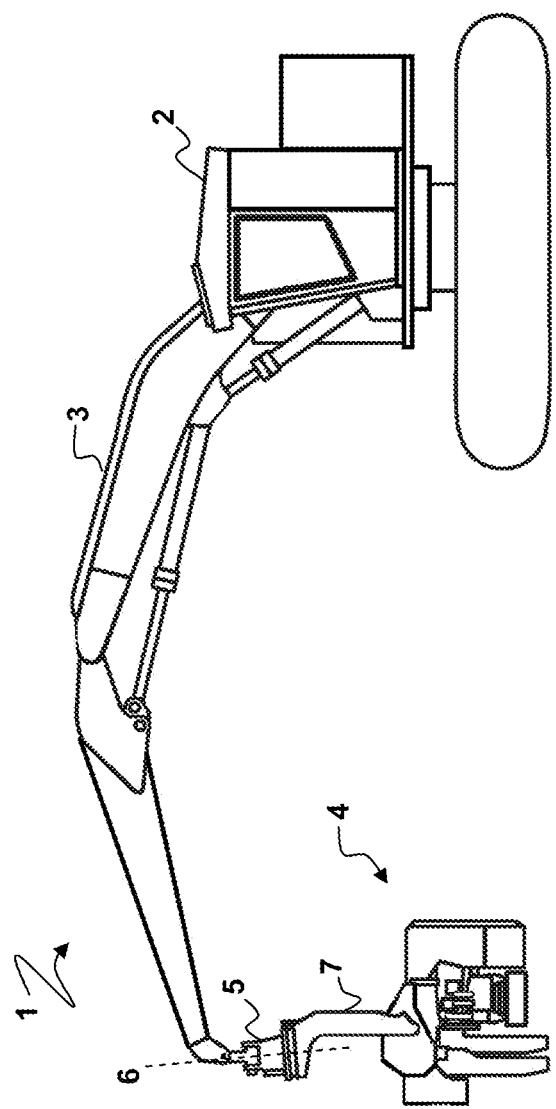
FIG. 1 is a side view of an example timber-working system including, for example, a forestry head according to one aspect of the present disclosure.

Throughout this specification, the words "comprise" or "include", or variations thereof such as "comprises", "includes", "comprising" or "including", will be understood to imply the inclusion of a stated element, integer or step, or group of elements integers or steps, but not the exclusion of any other element, integer or step, or group of elements, integers or steps.

The timber-working device may be a forestry or harvester head, and may be referred to as such throughout the specification. Forestry heads typically have the capacity to grapple and fell a standing tree, delimb and/or debark a felled stem, and cut the stem into logs. However, a person skilled in the art should appreciate that the present disclosure may be used with other timber-working devices, and that reference to the timber-working device being a forestry head is not intended to be limiting.

One well known system for forestry heads uses opposing drive arms, one on each side of the feed axis. Each drive arm may include a feed wheel configured to be brought in contact with stem. The arms may be driven, for example by hydraulic cylinders, to pivot relative to the frame of the device in order to grapple the stem with the feed wheels. The feed wheels may each be connected to a rotary drive and used to drive or feed the stems along the feed axis of the head.

The timber-working device may further include a single feed wheel driven by a rotary drive and mounted to the frame. This frame mounted feed wheel may be used together with the arm mounted feed wheels to drive the stem(s). The frame mounted feed wheel may be aligned with the arm mounted feed wheels relative to the feed axis. It should be appreciated that the device may include more than one frame mounted feed wheel.

Each drive arm may include an engagement member configured to be inserted into one of the apertures.

The engagement member may be any suitable means known in the art for connecting via an aperture and permitting pivotal movement therebetween. For example, the engagement member may be a pin connected to the drive arm and configured to extend into the aperture. It should be appreciated that the engagement member may include more than one component—for example a pin together with a bush.

The fit of the engagement member of the drive arm with the elongate aperture may be looser than that of the engagement member of the other drive arm with the other aperture. This may allow for sliding of the engagement member along the elongate aperture without undesirable friction causing wear.

The longitudinal axis of each aperture, with which the respective engagement members may be aligned, may be parallel to each other.

In an embodiment, the travel of the engagement member along the at least one elongate aperture may be within the range of substantially 40 millimeters to 60 millimeters. More particularly, the travel may be substantially 50 millimeters. Limiting the range of travel may be useful The elongate member may have a reverse curvature along its length. Reference to a reverse curvature should be understood to mean a shape in which a curve transitions to another curve in the opposite direction—occasionally referred to as an "S" curve.

The elongate member may have a long section at a first end of the reverse curvature, and a short section at the other end of the reverse curvature.

The elongate aperture may be located in the long section. It is envisaged that locating the elongate aperture in the long section may allow the elongate aperture to be substantially linear along its length.

The length of the at least one elongate aperture may be at least substantially twice the diameter of the other aperture.

The timber-working device may include delimb arms. Such delimb arms are known in the art, being configured to be closed about the stem(s), and including sharpened edges to cut limbs from the stem as it is driven by the feed wheels.

The timber-working device may include a cutting device—for example at least one saw. It is known for forestry heads to include a main chainsaw which is primarily used for the felling and cross cutting of stems. Further, some forestry heads may include a secondary or topping chainsaw. The topping saw is typically of a lower specification than the main saw, and used primarily during processing once a tree is felled.

Reference to the cutting device being a chainsaw is not intended to be limiting, as the saw may take other forms—for example a disc saw. Further, the cutting device may take other forms known in the art, for example a shear.

FIG. 1 illustrates a timber-working system including a carrier 1 for use in forest harvesting. The carrier 1 includes an operator cab 2 from which an operator (not shown) controls the carrier 1. The carrier 1 further includes a boom assembly 3, to which a timber-working device in the form of a forestry head 4 is connected.

Connection of the head 4 to the arm 3 includes a rotator 5, configured to rotate the head 4 about the generally vertical axis of rotation marked by dashed line 6. A tilt bracket 7 further allows rotation of the head 4 between a prone position (as illustrated) and a standing position.

Referring to FIG. 2, the head 4 includes a frame 8 to which the tilt bracket 7 of FIG. 1 is pivotally attached. Left hand (LH) and right hand (RH) delimb arms 9a and 9b are pivotally attached to the frame 8, as are opposing LH and RH drive arms 10a and 10b. LH and RH feed wheels 11a and 11b are attached to LH and RH drive arms 10a and 10b respectively, which together with a central frame-mounted feed wheel 12 may be controlled to feed one or more stems (not illustrated) along a feed axis of the head 4. Feed wheels 11a, 11b, and 12 may collectively be referred to as the 'feed mechanism.'

A main chainsaw 13, and a topping chainsaw 14, are attached to the frame 8. The main saw 13 is typically used to fell a tree when the head 4 is in a harvesting position, and to buck stems into logs in the processing position of the head 4 (as seen in FIG. 1). The topping saw 14 may be used to cut off a small-diameter top portion of the stem(s) to maximize the value recovery of the trees.

The LH and RH drive arms 10a and 10b are interconnected by timing link 15, which is described in more detail below with reference to FIG. 3.

The timing link 15 includes an elongate body 30 made of flat steel. The elongate body includes a long section 31 having a shallow curvature which transitions into a reverse curvature section 32 and ends in a short section 33.

The timing link includes a circular aperture 34 at the end of the short section 33, and an elongate aperture 35 at the distal end of the long section 31.

In this example embodiment the length 36 of the elongate aperture 35 is substantially 50 millimeters along the centerline 37 between its center marks 38a and 38b at its respective ends. The overall length of the elongate aperture 35 is at least substantially 90 millimeters.

The angle 39 between the center line 37 of the elongate aperture 35 and line 40 drawn between the first center mark 38a of the elongate aperture 35, and the center mark 41 of the circular aperture 34, is substantially 30 degrees.

The width 42 of the elongate aperture 35 is greater than the diameter of the circular aperture 34, in order to achieve a comparatively looser fit when bushes having the same dimensions are inserted into the respective apertures.

Figure 4A:
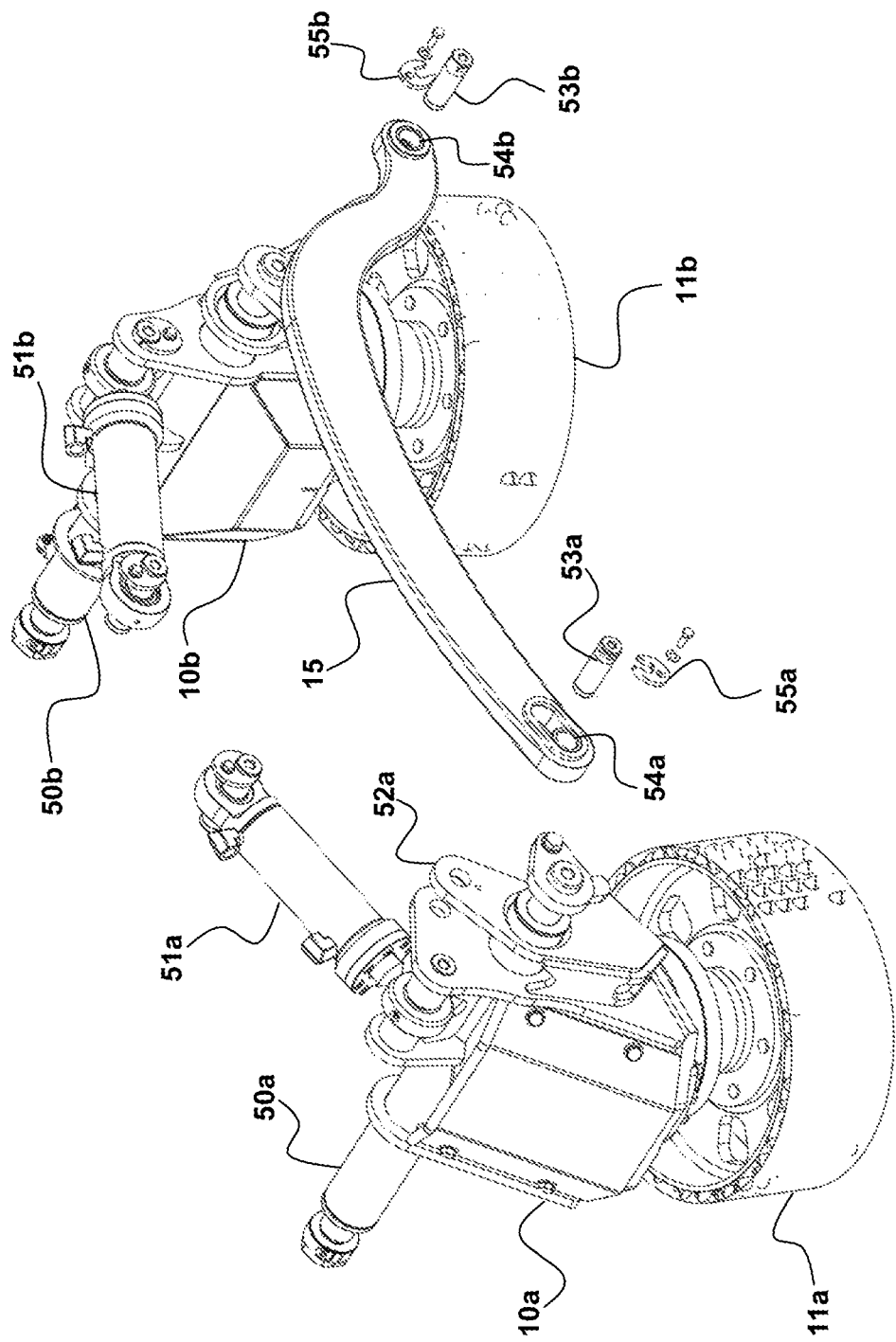
FIG. 4A is an exploded perspective view of an example drive system including the timing link.
Figure 4B:
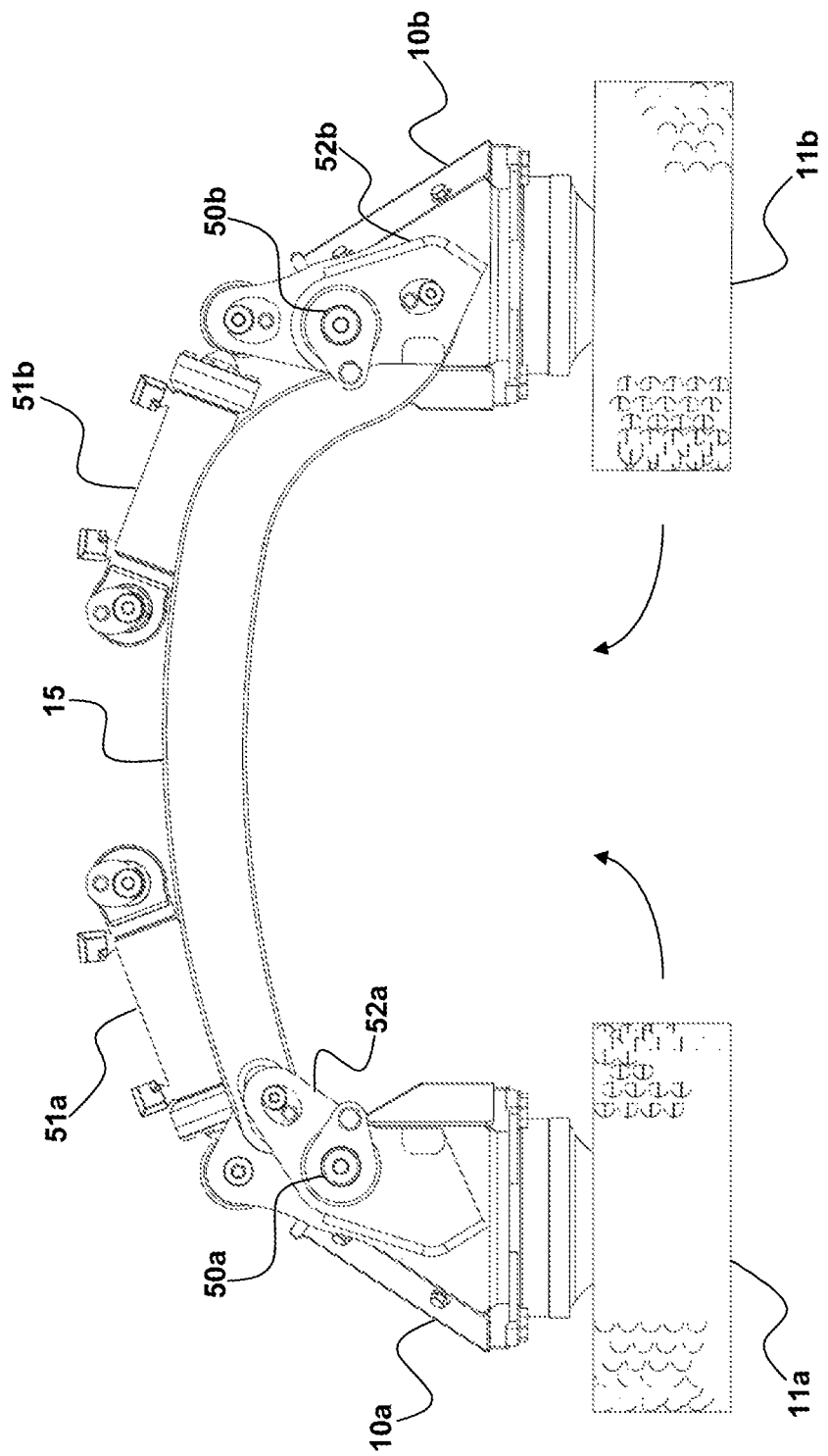
FIG. 4B is a face on view of the example drive system.

FIGS. 4A and 4B show the timing link relative to the feed mechanism of the head 4 (although central frame-mounted feed wheel 12 is not illustrated). Reference may be made to the frame 8 and central frame-mounted feed wheel 12 of FIG. 2.

LH and RH drive arm pins 50a and 50b are used to pivotally couple the LH and RH drive arms 10a and 10b to the frame 8. LH and RH hydraulic cylinders 51a and 51b are coupled to the frame 8 and LH and RH drive arms 10a and 10b.

The drive arms 10a and 10b include wing plates 52a and 52b respectively, to which the link 15 is connected. Wing plate 52a is positioned on the other side of the LH drive arm pin 50a relative to the feed wheel 11a, while wing plate 52b is positioned on the same side of the RH drive arm pin 50b.

The timing link 15 is connected to the wing plate 52a way of LH link pin 53a and bush 54a through the elongate aperture 35, the LH link pin 53a located in position by retainer clip 55a. Similarly, the other end of the timing link 15 is connected to the wing plate 52b way of RH link pin 53b and bush 54b through the circular aperture 34, the RH link pin 53b located in position by retainer clip 55b.

The longitudinal axes of apertures 45 and 35, which align with those of the LH and RH link pins 53a and 53b respectively, are parallel to each other.

Operation of the feed mechanism will be described with reference to FIG. 3 as well as FIG. 4A and FIG. 4B.

Extension of the LH and RH cylinders 51*a* and 51*b* causes LH and RH drive arms 10*a* and 10*b* to pivot inwardly—causing the feed wheels 11*a* and 11*b* to bear against any stems therebetween and hold them against central frame-mounted feed wheel 12.

When closing the arms 10*a* and 10*b*, it may be desirable to ensure that the arms close at essentially the same rate to assist in picking up the stem(s) and centring it in the head 4.

If the LH drive arm 10*a* leads the RH drive arm 10*b*, the LH link pin 53*a* and bush 54*a* travel along the elongate aperture 35 to center mark 38*a*, at which point the timing link 15 begins to pull RH drive arm 10*b*, or at least restrict movement of the LH drive arm 10*a* until the RH drive arm 10*b* has caught up. The same logic applies in reverse.

Once the drive arms 10*a* and 10*b* have closed on the stem(s), the length 36 of the elongate aperture permits a degree of "float" between the respective angular positions of the drive arms 10*a* and 10*b* to accommodate for variance in the size and position of the stem as it is fed through the head 4 by the feed wheels 11*a*, 11*b*, and 12. This float may allow more consistent contact between the feed wheels 11*a* and 11*b*, which influences the effectiveness of debarking and feeding using the wheels 11*a* and 11*b*.

The example 50 millimeters of travel may allow for this, while still maintaining a degree of synchronization—particularly when opening and closing the drive arms 10*a* and 10*b*.

Aspects of the present disclosure have been described by way of example only and it should be appreciated that modifications and additions may be made thereto without departing from the scope thereof as defined in the appended claims.

What we claim is:

1. A timber-working device, comprising:
   a frame;
   a first drive arm and a second drive arm, the first drive arm and second drive arm pivotally attached to the frame;
   a first hydraulic cylinder connected between the first drive arm and the frame, and a second hydraulic cylinder connected between the second drive arm and the frame, wherein the first hydraulic cylinder and the second hydraulic cylinder are operable to pivot the first drive arm and the second drive arm relative to the frame;
   at least one feed wheel; and
   a timing link comprising an elongate member having a first end and a second end, and a first aperture at the first end and a second aperture at the second end, wherein at least one of the first aperture and the second aperture is elongate along the length of the member,
   wherein the timing link is connected to the first drive arm and the second drive arm via the first and second apertures.

2. The timber-working device of claim 1, wherein the first drive arm comprises a first engagement member and the second drive arm comprises a second engagement member, the respective engagement members being configured to be inserted into one of the apertures, wherein the fit between the engagement member and the elongate aperture is looser than the fit between the other engagement member and the other aperture.

3. The timber-working device of claim 2, wherein the travel of the engagement member along the at least one elongate aperture is within the range of 40 millimeters to 60 millimeters.

4. The timber-working device of claim 3, wherein the travel of the engagement member along the at least one elongate aperture is 50 millimeters.

5. The timber-working head of claim 2, wherein the length of the at least one elongate aperture is at least twice the diameter of the other aperture.

6. The timber-working device of claim 2, wherein the elongate member has a reverse curvature along its length.

7. The timber-working device of claim 6, wherein the elongate member has a long section at a first end of the reverse curvature, and a short section at the other end of the reverse curvature, and wherein the elongate aperture is located in the long section.

8. The timber-working device of claim 1, wherein the at least one feed wheel comprises a first drive arm-mounted feed wheel mounted to the first drive arm and driven by a first rotary drive, and a second drive arm-mounted feed wheel mounted to the second drive arm and driven by a second rotary drive.

9. The timber-working device of claim 1, wherein the at least one feed wheel comprises a frame mounted feed wheel driven by a frame mounted rotary drive.

\* \* \* \* \*

UNITED STATES PATENT AND TRADEMARK OFFICE
CERTIFICATE OF CORRECTION

PATENT NO. : 10,238,045 B2
APPLICATION NO. : 15/100179
DATED : March 26, 2019
INVENTOR(S) : Boys et al.

It is certified that error appears in the above-identified patent and that said Letters Patent is hereby corrected as shown below:

In the Claims

In Column 5, Claim 1, Line 37, insert -- the -- after "the first drive arm and".

In Column 6, Claim 1, Line 5, insert -- elongate -- after "length of the".

In Column 6, Claim 2, Line 12, delete "respective" and insert -- first and second -- after "member, the".

In Column 6, Claim 2, Line 13, delete "one of" after "inserted into".

In Column 6, Claim 2, Line 13, insert -- respective first and second -- before "apertures".

In Column 6, Claim 2, Line 14, insert -- first -- before "engagement member".

In Column 6, Claim 2, Line 14, delete "elongate" and insert -- first -- after "and the".

In Column 6, Claim 2, Line 15, delete "other" and insert -- second -- before "engagement member".

In Column 6, Claim 2, Line 15, delete "other" and insert -- second -- after "member and the".

In Column 6, Claim 3, Line 17, delete "the" and insert -- a -- after "wherein".

In Column 6, Claim 3, Line 18, insert -- first -- after "travel of the".

In Column 6, Claim 3, Line 18-19, delete "at least one elongate" and insert -- first -- after "along the".

In Column 6, Claim 4, Line 22, insert -- first -- after "travel of the".

In Column 6, Claim 4, Line 22-23, delete "at least one alongate" and insert -- first -- after "the".

Signed and Sealed this
Twenty-ninth Day of October, 2019

Andrei Iancu
*Director of the United States Patent and Trademark Office*

CERTIFICATE OF CORRECTION (continued)
U.S. Pat. No. 10,238,045 B2

In Column 6, Claim 5, Line 24, delete "the" and insert -- a -- after "wherein".

In Column 6, Claim 5, Line 25, delete "at least one" and insert -- first -- after "the".

In Column 6, Claim 5, Line 25, delete "the" and insert -- a -- after "twice".

In Column 6, Claim 5, Line 26, delete "other" and insert -- second -- after "of the".

In Column 6, Claim 7, Line 32, delete "elongate" and insert -- first -- after "wherein the".